Patented Mar. 2, 1937

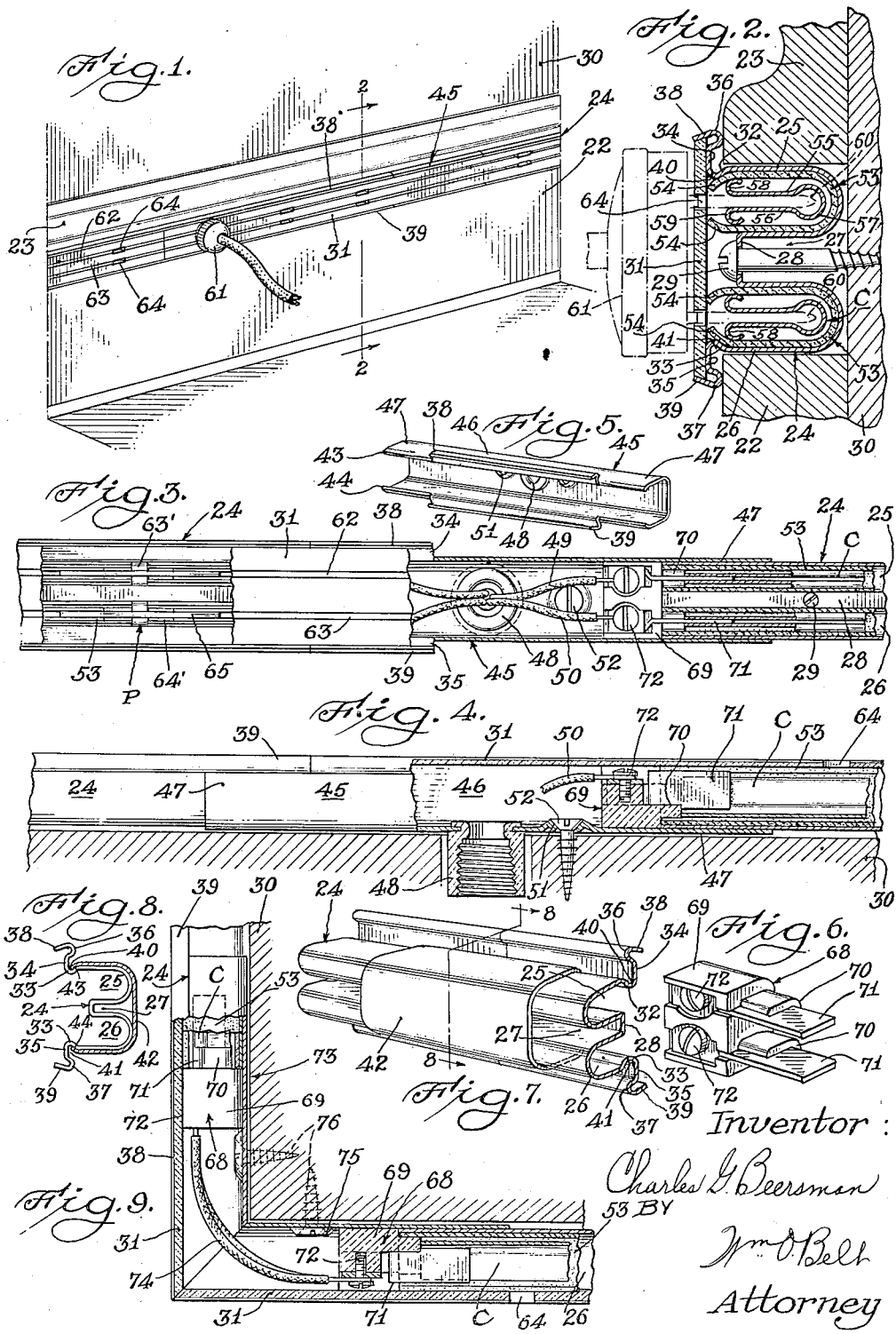

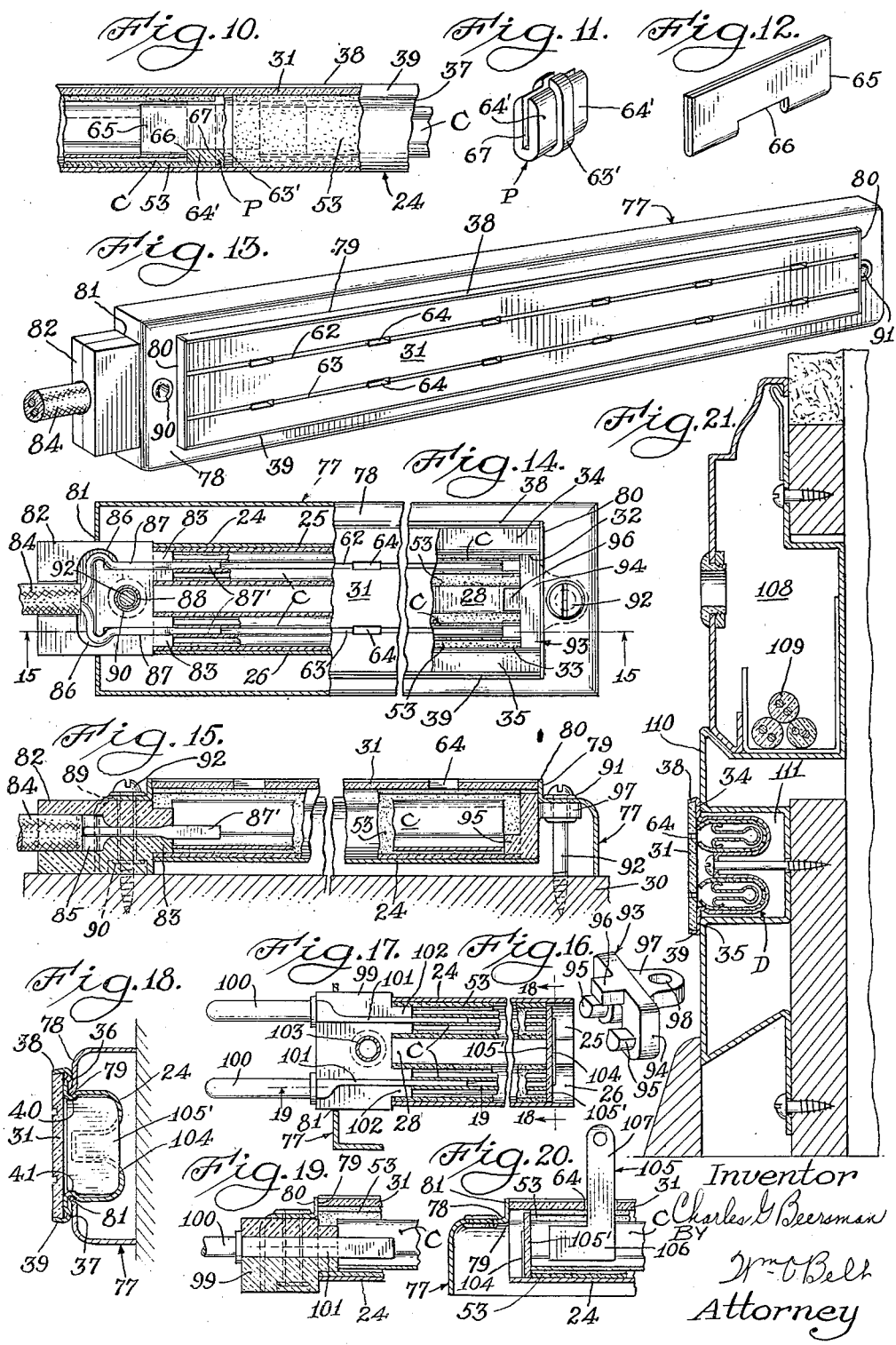

2,072,702

UNITED STATES PATENT OFFICE 2,072,702

ELECTRICAL OUTLET DEVICE

Charles G. Beersman, Evanston, Ill.

Application April 16, 1934, Serial No. 720,751

11 Claims. (Cl. 247—3)

This invention relates to electrical outlet devices of the kind affording a plurality of places whereat electrically operated appliances, tools or the like may be connected in an electric circuit.

One of the objects of my invention is to afford movement of the conductor in an outlet device to facilitate connection of an attachment device thereto and to insure good electrical non-arcing contact between the conductor and the attachment device.

Another object is to secure the cover of the outlet device thereon without the use of removable securing devices extended through the cover to thereby enhance the appearance of the outlet device and simplify installation thereof.

Still other objects are to provide a novel outlet device adaptable for use in a wide variety of installations; such as, mounting the device in a groove in a wall, baseboard or the like; to avoid an unsightly appearance along the edges of a groove when the device is mounted therein; to afford proper orientation of the device in grooves of varying sizes; and to conceal the means securing the device in position.

Further objects are to provide a novel outlet device of simple and economical construction and which may be expeditiously installed and which includes a housing made from a single piece of metal shaped to provide independent channels each adapted to accommodate an electrical conductor; to effectively insulate the conductors from each other and the housing and to insure against short-circuiting under normal and abnormal conditions; to employ a similar insulating member in all of the channels; to employ a similar conductor strip in all of the channels; to effectively prevent displacement of the insulating members and conductor strips from the channels; to equip the housing with devices for securing a face plate thereon; to dispose the part of the housing interconnecting the channels thereof in spaced relation with the face plate so that the heads of securing devices passed through said part may be disposed below the face plate; and to securely interconnect aligned sections of the outlet device to thereby electrically bond the metallic housings and prevent buckling of the sections at the joint.

Other objects are to employ a device affording interconnection with a wiring system and which may be mounted in the groove or the like receiving the outlet device; to so secure the face plate of the outlet device in position that it may be uninterruptingly extended across the device affording interconnection with a wiring system; to facilitate interconnection of conductors of the wiring system with the conductors of the outlet device; and to afford a firm mechanical and electrically bonded interconnection between the device affording interconnection with said wiring system and the outlet device.

Further objects are to facilitate passage of my outlet device around a corner; to facilitate interconnection of the respective conductors in sections of my outlet device leading to a corner and to effectively insulate the interconnections from the metallic housing; and to uninterruptingly extend the face plate of my outlet device over the device directing my outlet device about a corner to insure complete enclosure and avoid an unsightly appearance.

Still further objects are to facilitate interconnection of the insulating members and conductors in adjoining sections of my outlet device and to bridge any gap between the ends of the insulating members in adjoining sections and consequent exposure of the conductors in such adjoining sections; to effectively close the free end of my outlet device to prevent displacement of the insulating members and conductor strips therein; and to prevent displacement of the device closing the free end of the outlet device.

Still further objects are to provide a novel unit assembly affording a limited number of closely associated places whereat electrically operated devices may be connected in an electrical circuit; to expedite fabrication of such a unit assembly; to afford firm interconnection with the unit assembly of means connecting the unit assembly in an electric circuit; to effectively prevent endwise movement of the conductors of the unit assembly; and to provide a unit assembly which may be laid upon the floor, secured to a wall or used in any other desired manner.

And a still further object of the invention is to incorporate my novel electrical outlet device in a baseboard or the like affording passages through which electrical conductors may be extended to thereby afford in such a baseboard or the like a plurality of places whereat electrically operated devices may be connected in an electric circuit.

Selected embodiments of the invention are illustrated in the accompanying drawings wherein Fig. 1 is a perspective view illustrating a typical installation of my novel outlet device;

Fig. 2 is a transverse sectional view substantially on the line 2—2 on Fig. 1;

Fig. 3 is a front view, partly in elevation and partly in section, of my outlet device including the terminal box thereof;

Fig. 4 is a side view, partly in elevation and partly in section, of the device as illustrated in Fig. 3;

Fig. 5 is a perspective detail view of the terminal box;

Fig. 6 is a perspective detail view of the terminal block;

Fig. 7 is a fragmentary perspective rear view illustrating the interconnection of adjoining sections of the housing of my outlet device;

Fig. 8 is a sectional detail view substantially on the line 8—8 on Fig. 7;

Fig. 9 is a plan view, partly in elevation and partly in section, illustrating an outside corner arrangement;

Fig. 10 is a side view, partly in elevation and partly in section, illustrating the interconnection of the conductor strips and insulating strips in adjoining sections of my outlet device;

Fig. 11 is a perspective detail view of an insulator block used in the interconnection shown in Fig. 10;

Fig. 12 is a perspective detail view of a connector strip employed with the block illustrated in Fig. 11;

Fig. 13 is a perspective view of a unit assembly constituting one form of my device;

Fig. 14 is a fragmentary front view, partly in elevation and partly in section, of the unit assembly illustrated in Fig. 13;

Fig. 15 is a sectional detail view substantially on the line 15—15 on Fig. 14;

Fig. 16 is a perspective detail view of an end closing member;

Fig. 17 is a sectional view, similar to Fig. 14, illustrating a modified form of the device;

Fig. 18 is a transverse sectional detail view substantially on the line 18—18 on Fig. 17;

Fig. 19 is a longitudinal sectional detail view substantially on the line 19—19 on Fig. 17;

Fig. 20 is a vertical sectional detail view illustrating another form of connector employed in the device; and Fig. 21 is a vertical sectional detail view illustrating the use of my device with a conductor enclosing baseboard.

My outlet device may be installed conveniently in an ordinary baseboard, indicated by 22 in the accompanying drawings, either by routing such baseboard to receive the outlet device or by positioning the outlet device in a groove defined intermediate the top edge of a baseboard and the bottom edge of the usual molding 23 customarily provided at the top of a baseboard. This latter type of installation is illustrated in Figs. 1 and 2.

My outlet device as illustrated includes a housing, generally indicated by 24, formed from a metallic strip bent to provide two spaced parallel substantially U-shaped channels 25 and 26 opening toward the front of the housing and separated from each other by a channel 27 opening toward the rear of the housing. A web 28 extending between adjacent inner walls of the channels 25 and 26 well below the face of the housing 24 provides the bottom wall of the channel 27. Openings are provided at suitable intervals in the web 28 so that securing devices, such as the wood screw 29, may be passed therethrough to secure the outlet device in the groove. Toggle bolts or other approved securing means may be used in place of the wood screws and the web 28 is disposed sufficiently below the front of the housing 24 that the heads of the securing devices will be spaced from the closure or face plate 31, made of insulating material, closing the front of the housing 24 and secured in position in a manner to be explained.

The upper ends of the outer walls of the channels 25 and 26 are bent inwardly to define lips 32 and 33 which overlie the channels and these lips terminate in sections 34 and 35 which extend parallel with the web 28 but which are located in a plane outwardly of the plane in which the web 28 is located. The face plate 31 rests on the sections 34 and 35. When a baseboard is routed to receive my improved outlet device or even when my outlet device is mounted in a groove between the top edge of a baseboard and the lower edge of a molding, the edges of the groove may not be uniform. Hence, I project the sections 34 and 35 beyond the outer walls of the channels 25 and 26 in an amount sufficient to overlap any irregularities in the edges of the groove in which my outlet device is mounted and in this way I avoid an unsightly appearance and other objectionable conditions.

Baseboards vary in thickness and preferably the housing 24 is of such depth that it will fit into a groove in the thinnest of baseboards in common use. However, to so size the housing might so restrict the depth thereof that sufficient space might not be afforded in the channels 25 and 26 to accommodate the conductor strips mounted therein. I have therefore provided an arrangement which affords sufficient space in the channels 25 and 26 to accommodate conductor strips of ample size and at the same time I am enabled to use the device with relatively thin baseboards. Moreover, by the arrangement I provide I am enabled to use the same size outlet device with baseboards of varying thicknesses for I do not rely upon the thickness of the baseboards to locate the face of the device relative to the face of the baseboard. My arrangement includes forming substantially U-shaped portions 36 and 37 at the outer ends of the sections 34 and 35 and projecting these U-shaped portions rearwardly so that the outer surfaces of the bights thereof may rest against the face of the baseboard or the like receiving my device. When the outlet device is installed in a groove, the securing devices 29 are tightened to snugly engage the bights of the portions 36 and 37 against the outer surface of the baseboard or the like which further insures against an unsightly appearance or other objectionable conditions along the edges of my device. The face of the housing 24 is therefore positioned above the face of the baseboard or the like and this facilitates access thereto.

The outwardly disposed limbs of the U-shaped portions 36 and 37 provide inwardly inclined flanges 38 and 39 which project beyond the outwardly disposed faces of the sections 34 and 35 in an amount substantially equal to the thickness of the face plate 31. The side edges of the face plate 31 are inclined correspondingly to the inclination of the flanges 38 and 39 and the flanges are sufficiently resilient to permit the face plate 31 to be forced into engagement with the sections 34 and 35. The innate resiliency of the flanges and the cooperating inclinations retain the face plate 31 in position. The face plate 31 may be removed by inserting a suitable thin implement between one of the resilient flanges and the adjacent edge of the plate and forcing the edge of the plate from engagement with the flange. In event the U-shaped portions 36 and 37 are not used the inclined flanges 38 and 39 will be provided at the outer ends of the sections 34 and 35 or, if these are omitted, directly on the outer walls of the channels. This manner of retaining the face plate has numerous advantages among which are the ease with which the face plate can be installed and removed and the omission of retaining devices from the face of the plate, the latter also being enabled by reason of the positioning of the web 28 in the manner previously described.

The housing 24 will be provided in sections of suitable length. For example, each section may be eight feet in length and the housing may be cut to provide shorter lengths when and as required. When it is desired to provide a longer length the ends of two sections of the housing 24 are abutted and I have provided a convenient means for interconnecting such abutted sections. Outwardly opening grooves 40 and 41 are defined by the lips 32 and 33 and the sections 34 and 35. A housing connector 42 is provided and it is of sufficient length to overlap abutted sections of the housing 24 for an appreciable distance away from the abutment. The housing connector 42 includes a rear wall and side walls which overlie the outer walls of the channels 25 and 26. Inturned lips 43 and 44, Fig. 8, are provided at the free upper edges of these side walls, and these lips respectively fit into the grooves 40 and 41 and by reason of the innate resiliency of the housing 42 and the interlocking of the lips in the grooves and the extent of the housing connector 42 on opposite sides of the ends of abutted sections of the housing 24, the sections of the housing are firmly connected with each other and buckling at the joint or abutment is prevented. Moreover, when the sections of the housing 24 are grounded the firm connection afforded by the housing connector 42 electrically bonds the sections.

The sections of the housing 24 and the housing connectors 42 afford a convenient means of installing my improved outlet device for the sections of the housing may be installed during the construction of a building or at a convenient time in the repair of an old building and the conductor strips, insulating strips, face plate, and other devices used with the sections of the housing may be installed conveniently at a later time. This fits in well with the conduit system of wiring now commonly in use for the sections of the housing may be installed at the time the conduit is installed and the other parts of the device may be installed at the time that the wires are installed or fished in, as it is called in the art.

A convenient means for bringing electrical conductors into the housing 24 is to use a terminal box, and in Fig. 5 I have illustrated a terminal box suitable for such purpose. The illustrated terminal box is adapted for use with a conduit system of wiring and is equipped with means for connecting the conduit thereto but it is to be understood that if my outlet device is to be used with another type of wiring system, the conduit connecting means will be replaced by a device adaptable for use with the system. The terminal box shown in Fig. 5 and generally indicated by 45 fits in the groove receiving my outlet device. The terminal box includes an intermediate section 46 and end sections 47, 47. The upper parts of the side walls of the intermediate sections 46 are formed similarly to the outer walls of the channels 25 and 26, that is to say, they are provided with portions corresponding to the lips 32 and 33, the sections 34 and 35, the U-shaped portions 36 and 37, and the inclined flanges 38 and 39. The upper ends of the side walls of the end sections 47 are shaped similarly to the upper edges of the side walls of the housing connector 42 and are equipped with lips like the lips 43 and 44. Hence, the ends of the sections of the housing 24 may be arranged within the end sections 47 and extended to the intermediate section 46 so that the flanges 38 and 39 on the sections of the housing will cooperate with the flanges 38 and 39 on the intermediate section of the terminal box to provide continuous retaining means for the face plate 31.

In Fig. 1 a typical installation of a terminal box 45 is illustrated and by referring thereto it may be seen that the face plate 31 is so applied that it extends directly across the terminal box 45 and the adjacent sections of the housing 24 without interruption. The face plate 31 may conveniently be provided in sections of a length corresponding to the length of the sections of the housing 24 although, if desired, the plate may be provided in other lengths if it is found convenient so to do. The ends of the face plates 31 are abutted to provide a continuous uninterrupted cover for the outlet device as is illustrated in Fig. 1.

A connector 48 (Fig. 4) is secured in the rear wall of the intermediate section 46 of the terminal box 45 to permit connection of conduit thereto. Electrical conductors 49 and 50 from the conduit pass through the connector into the terminal box to be connected to the conductor strips mounted in the housing 24, as will be explained. Openings 51 are provided in the rear wall of the intermediate section 46, through which suitable securing devices, such as wood screws 52, may be passed to secure the terminal box to the wall 30 and in the groove adapted to receive the outlet device.

An objectionable feature in outlet devices of the kind to which my invention appertains as these devices have heretofore been constructed is that the insulating members or strips provided in the metallic housings were formed as right and left hand members to respectively fit in the right and left hand channels in the metallic housing. I avoid this objection by providing insulating strips which are identical in cross section so that they may be fitted either into the channel 25 or into the channel 26. Such insulating strips are generally indicated by 53 in the accompanying drawings and are substantially U-shaped in cross section to be complementary to the channels 25 and 26 so that the bights thereof may be respectively rested in the bights of the channels 25 and 26. The limb portions of the insulating strips respectively rest against the outer and inner walls of the channels 25 and 26 and at the upper ends these side walls are curved inwardly, as indicated at 54. The inwardly curved portions 54 are of sufficient length to project well beyond the lips 32 and 33 and these portions 54 extend to the underside of the face plate 31. The portions 54 also project well beyond the web 28. Consequently the insulating strips 53 effectively insulate the conductor strips which are mounted therein, as will be explained, from the metallic housing 24. When the insulating strips are disposed in the channels 25 and 26 the inwardly curved portions 54 on the limbs engaging the outer walls of the channels 25 and 26 underlie the lips 32 and 33. The insulating strips possess sufficient innate resiliency to neatly fit in the channels and the overlying of the portions 54 by the lips 32 and 33 effectively prevents outward movement of the insulating strips from the channels 25 and 26. The insulating strips 53 are preferably provided in sections of a length shorter than the length of the sections of the housing 24.

Another objectional feature in outlet devices of the kind to which my invention appertains as these devices have heretofore been constructed has been that the conductors have been rigidly mounted. Because of variations in the prongs of the attachment plugs adapted to be engaged with the conductors it is often difficult to insert the prongs into engagement with the conductors and it has also been difficult to obtain good electrical non-arcing contact. To overcome such difficulties, I mount the conductors in the insulating strips in a manner which permits movement of the conductors in the insulating strips and this coupled with the innate resiliency and form of the conductors facilitates insertion of the prongs of the attachment plugs and insures good electrical non-arcing contact between the prongs and the conductors. Another feature of my device is that the conductors, like the insulating strips, need not be made in rights and lefts to respectively fit into the right hand and left hand channels of the metallic housing for the conductors of my device may be mounted in either the channel 25 or the channel 26. The conductors, generally indicated by C, are strips formed from innately resilient material possessing good conductivity and are formed to include parallel limbs 55 and 56 spaced from each other and terminating at their inner ends in a substantially circular part 57. The free ends of the limbs 55 and 56 terminate in rolled portions 58 and 59 which rest against the insulating strips 53. The rolled portions permit the conductor strips to move in the insulating strips 53 since all portions of the conductor strips save the rolled portions are spaced from the conductor strips and because the rolled portions permit the conductor strips to pivot thereabout. The prongs 60 of the attachment plug 61 are passed between the parallel limbs 55 and 56 and since the conductor strips may move to accommodate themselves to the prongs insertion of the prongs is facilitated and good electrical non-arcing contact is insured. The rolled portions on the outwardly disposed limbs of the conductor strips underlie the portions 54 of the insulating strips, which underlie the lips 32 and 33, and this prevents outward movement of the conductor strips in the insulating strips. The conductor strips are preferably furnished in sections of a length shorter than the length of the sections of the housing 24 and the insulating strips 53.

Parallel shallow grooves 62 and 63 are provided in the face of the face plate 31 and these grooves are aligned with the space between the limbs 55 and 56 of the conductor strips C respectively mounted in the channels 25 and 26. Sets of openings 64 are provided at suitably spaced intervals along the grooves 62 and 63 to permit the insertion of the prongs 60 into contact with the limbs 55 and 56. If desired, the grooves 62 and 63 may be omitted and only the openings 64 provided to permit insertion of the prongs. The grooves facilitate the insertion of the prongs 60 since they serve as locating means for the prongs need only be seated in these grooves and slid therealong until they pass through a set of openings 64.

It has been explained that the housing 24 is preferably installed prior to the time the insulating and conductor strips are installed although, of course, other installation procedure may be followed. It has also been explained that the insulating strips 53 and conductor strips C are provided in standard sections of a length preferably shorter than the length of the sections of the housing 24. Thus, when a number of sections of the housing have been connected together, it is necessary to interconnect the insulating strips and conductor strips which are installed in the sections of the housing. This has been a troublesome problem in outlet devices of the kind to which my invention appertains as these devices have heretofore been constructed because of the likelihood of the abutting ends of the insulating strips separating and permitting grounding of the conductor strips on the metallic housing. To avoid such grounding of the conductor strips I have provided a connector block illustrated in Fig. 11 and generally indicated by P. The block P is made of insulating material and includes an intermediate part 63' and end parts 64'. The intermediate part 63' of the block is adapted to neatly fit in either the channel 25 or the channel 26. The end parts 64' are smaller in cross section than the intermediate part 63' to permit the ends of insulating strips 53, which are to be interconnected, to be fitted thereover so that the ends will abut the edges of the intermediate part 63'. The end parts 64' are made of a sufficient length so that the insulating strips 53 will not separate therefrom in the use of the device and therefore the conductor strips C which are to be interconnected will be prevented from grounding on the metallic housing 24. The ends of the conductor strips C preferably abut the ends of the end parts 64', and these conductor strips are electrically interconnected by the connector strip 65, Fig. 12, which preferably consists of a strip of metal folded upon itself and recessed as indicated at 66 along the bight edge thereof. The length of the recess 66 is equal to the length of the connector block P which is slotted as indicated at 67 so that the connector strip 65 may be fitted thereinto with the ends of the recess 66 engaging the ends of the end parts 64'. When the connector strip 65 is so inserted, the end portions thereof fit tightly between the limbs 55 and 56 of the conductor strips to be interconnected and the interconnection between the connector strip 65 and the connector block P prevents relative movement between these parts and as the ends of the conductor strips abut the ends of the end parts 64' it is clear that electrical interconnection of the conductor strips is assured.

The preferred manner of installing the block P, after sections of the housings 24 have been interconnected, is to first install the conductor strips C in the insulating strips 53. Then the block P is positioned in the housing 24 with the periphery of the intermediate part 63' engaged in the channel. Then one of the insulating strips 53 having a conductor strip C therein is inserted into the channel and the end of this insulating strip is slid over the adjacent end part 64' to abut the edge of the intermediate part 63' and the end of the conductor strip C is abutted with the end of this end part 64'. Then the other of the insulating strips 53 having a conductor strip C therein is inserted in the aligned channel and the end of this insulating strip is slid over the adjacent end part 64' to abut the intermediate part 63' and the end of the conductor strip C in this insulating strip is engaged with the end of the adjacent end part 64'. It is preferred, although it is not essential, that the block P be installed in a position remote from the interconnection of abutting sections of the housing 24 but because of the positive interconnection afforded by the block P and the housing connector 42 it is not essential that such remote installation be effected.

It has been explained that conductors 49 and 50 are passed into the terminal box 45 and that these conductors are adapted to be connected to the conductor strips in the device. To this end I provide a terminal block (Fig. 6) generally indicated by 68. The block 68 is made of insulating material and includes a main body 69 adapted to neatly fit in the intermediate section 46 of the terminal box 45 adjacent the end thereof. Bosses 70 extend from one end of the main body 69 and are adapted to respectively extend into the insulating strips 53 in the channels 25 and 26 of the section of the housing 24 connected to the terminal box 45 by said end section 47, the insulating strips overlapping these bosses in much the same way as the insulating strips overlap the end parts 64' of the connector block P. The main body 69 and the bosses 70 are recessed to receive connectors which include plates 71 adapted to fit between the limbs 55 and 56 of the conductor strips C mounted in the insulating strips 53 overlapping the bosses 70. The conductor strips C preferably abut the ends of the bosses 70. The connectors in the terminal block also include parts receiving screws 72 which are used to respectively connect the conductors 49 and 50 to the connectors. The overlap of the insulating strips 53 on the bosses 70 effectively insulates the conductor strips C and the plates 71 from the housing 24. Furthermore, the limbs 55 and 56 tightly clamp the plates 71 to insure good electrical connection and the screws 72 firmly connect the conductors 49 and 50, and this insures good electrical connection between the conductors 49 and 50 and the conductor strips in the channels 25 and 26.

If the terminal box 45 is provided at the end of an extent of my outlet device one of the end portions 47 is omitted and this end of the terminal box is closed in a suitable manner. However, when the terminal box is provided intermediate two sections of the housing 24, as illustrated in the drawings, both end sections 47 are used and two sets of conductors are led into the terminal box or other suitable arrangement is provided so that an electrical connection of the kind just described is provided at each end of the terminal box.

When my improved device is mounted in a baseboard or the like, it will often be necessary to go around corners. To accomplish this I provide a corner member, such as that generally indicated by 73 in Fig. 9. While the illustrated corner member is adapted for use at an outside corner, it is to be understood that a similarly constructed member will be provided for an inside corner. The medial part of the corner member 73, that is, that portion thereof immediately adjacent the bend, is equipped with flanges 38 and 39 and the other parts in the same manner as the intermediate part 46 of the terminal box 45 is equipped with these flanges and other parts. The end portions of the corner member are shaped similarly to the end portions 47 of the terminal box. Hence, sections of the housing may be led up to the corner and connected to the corner member in the same manner as that in which they are connected to the terminal box. Terminal blocks 68 will be provided at the ends of the intermediate part of the corner member and will be mounted in the same manner as that in which these terminal blocks are mounted in the intermediate portion 46. Wires 74 will be led through the corner member to interconnect the connectors in the terminal blocks at opposite ends of the corner member. The corner member 73 is mounted in the groove receiving my outlet device and has openings 75 therein through which wood screws 76 or other suitable securing devices may be passed to secure the corner member in the groove. The just described arrangement provides an expeditious manner for going around either an outside or an inside corner and enables a continuation of the electric circuit. As has been explained in connection with the terminal box, the arrangement for interconnection with the conductor strips effectively insulates the conductor strips from the housing and prevents grounding of the strips on the housing. Since the corner member is equipped with flanges 38 and 39, the face plates 31 may be applied over the corner member and the abutting edges of the face plates meeting in the corner member may be neatly fitted together as by being mitered.

There are many places where it is desirable to connect a number of electrical devices in circuit simultaneously as, for example, a table in a kitchen or a dining room where it may be desirable to connect an electrically operated toaster, percolator, waffle iron and possibly other electrically operated appliances simultaneously. Another example is in connection with a work bench where it may be desirable to simultaneously connect in circuit a number of electrically operated tools. Moreover, in display rooms it is often desirable to connect a number of electrically operated devices such as lamps in circuit. In all of these circumstances it is necessary to provide a compact arrangement affording a plurality of places whereat electrically operated devices may be connected but for numerous reasons it may not be practical to provide an outlet device of the kind thus far described, that is to say, one adapted to be mounted in a groove in a wall or the like. To afford a number of places whereat a plurality of electrically operated devices may be connected in a compact device I have provided a unit assembly wherein a part of the device as thus far described is included. This unit assembly may be used where, for numerous reasons, it may not be practical to provide an outlet device of the kind previously described, that is to say, one adapted to be mounted in a groove in a wall or the like. I provide a housing for the unit assembly and this housing is so arranged that it may be laid upon the floor or so that it may be attached to a wall or the like and such a unit assembly is illustrated in Figs. 13 to 20 of the accompanying drawings.

The housing of the unit assembly is preferably made of metal and is generally indicated by 77. This housing includes depending side and end walls and a front wall 78 and is preferably stamped from a single piece of metal and formed into a substantially rectangular shape. The corners between the side and end walls and the front wall 78 may be rounded to enhance the appearance of the device and avoid sharp corners.

The back of the housing may be closed, if desired, by providing a suitable backing plate, separate from the housing and joined thereto in an approved manner. An elongated substantially rectangular opening 79 is medially located in the front wall 78 and flanges 80 are struck up from the front wall at opposite ends of this opening. The side edges of the opening 79 are slightly bent to provide lips 81, as best illustrated in Fig. 18. A section of the housing 24 of sufficient length to fit between the flanges 80 at opposite ends of the opening 79 is used and this section of the housing 24 is passed into the opening 79 so that the lips 81 fit in the grooves 40 and 41 in the manner in which the inturned lips 43 and 44 of the housing connector 42 fit in these grooves and the engagement of the lips 81 in the grooves 40 and 41 secures the section of the housing 24 in the opening 79. The U-shaped portions 36 and 37 rest against the front wall 78 and the inclined flanges 38 project upwardly from this front wall to receive and retain a face plate 31. The flanges 80 are of a height substantially equal to the height of the flanges 38 and 39 and the ends of the face plate 31 abut these flanges 80 which prevent endwise movement of the face plate. Insulating strips 53 and conductor strips C are mounted in the housing 24 in the manner previously described and by providing sets of openings 64 at suitable intervals along the face plate 31 a plurality of places whereat electrical appliances may be connected are provided.

In the preferred form of my unit assembly an opening 81 is provided in one of the end walls of the housing 77 through which a connector block 82 is extended. Bosses 83 are provided at the inner end of this connector block which are adapted to extend into the channels 25 and 26 of the section of the housing 24 mounted in the opening 79. These bosses 83 are similar to the end parts 64' and the bosses 70, that is to say, the end portions of the insulating strips 53, project about these bosses 83, the ends of the insulating strips and the housing 24 abutting the inner end of the connector block 82 about the bosses 83 as clearly illustrated in Figs. 14 and 15. Preferably the insulator block 82 is made in two parts to facilitate the installation of a section of lamp cord 84 or the like therein, the lamp cord 84 being extended into a pocket 85 in the connector block 82. The conductors of the lamp cord are separated and are directed through curved passages 86 and slots 87, which extend through the bosses 83, so that the conductors may be respectively extended into the conductor strips C in the channels 24 and 25. As illustrated, the ends of the conductors are flattened, as indicated at 87', this being preferred since it provides better contact and preferably the ends 87' are soldered to the conductor strips to prevent displacement. By extending the conductors of the lamp cord through the curved passages 86 a snubbing effect is attained which, in cooperation with the soldering of the end portions 87', effectively prevents disconnection of the lamp cord. An opening 88 extends through the connector block 82 and when the connector block is properly installed in position this opening is aligned with an opening 89 in the front wall 78 located intermediate the flange 80 and the end wall having the opening 81 therein. An elongated grommet 90 or other suitable securing device is passed through the openings 88 and 89 and clamps the connector block 82 to the housing 77 and secures the two parts of the block together. An eyelet or grommet 91 is mounted in an opening in the front wall 78 located between the flange 80 and the end wall of the housing 77 opposite that having the opening 81 therein. When the housing 77 is to be secured to a wall or the like, wood screws 92 or other suitable securing devices are passed through the grommets 90 and 91, as illustrated in Figs. 14 and 15, wherein such securing devices are shown as fastening the housing 77 to the wall 30.

I provide an end closing member, such as illustrated in Fig. 16 and generally indicated by 93, to prevent lengthwise movement of the insulating strips 53 and the conductor strips C in the section of housing 24 mounted in the opening 79. This end closing member includes a plate 94 having the side edges thereof spaced apart correspondingly to the spacing of the inner surfaces of the outer walls of the channels 25 and 26 so that when the plate 94 is placed in the end of the housing 24 the side edges of the plate will engage said inner surfaces. The plate is slotted medially to embrace the web 28 and the adjacent walls of the channels. Thus, the parts on each side of the slot respectively fit in the channels 25 and 26. The plate 94 has spaced bosses 95 on these parts which project from one face of the plate and which are adapted to extend into the insulating strips 53 mounted in the channels 25 and 26, the insulating strips overlapping these bosses and abutting the face of the plate 94. The conductor strips C abut the ends of the bosses 95. A lug 96 is positioned above the bosses 95 and has the upper edge thereof aligned with the top edge of the plate 94. This lug 96 is adapted to rest on the web 28 to orient the end closing member 93. When such an end closing member is used with my outlet device, as illustrated in Fig. 1, an opening is provided in the lug 96 and this opening is aligned with an opening in the web 28 so that a suitable securing device 29 may be passed through these openings to thereby secure the end of the section of the housing 24 and the end closing member in position. However, when the end closing member 93 is used with a device as shown in Fig. 13 another lug 97 is provided on the plate 94 opposite to the lug 96 and this lug 97 has an opening 98 therein through which the grommet 91 may be extended, as illustrated in Fig. 15, to thereby secure the end closing member 93 in position. When the end closing member 93 is so secured in position it is clear that the conductor strips C in the section of the housing 24 mounted in the openings 79 are effectively held against lengthwise movement since the ends of these conductor strips respectively engage the connector block 82 and the end closing member 93.

The lamp cord 84 may be of suitable length to extend to a place whereat it may be connected in electric circuit and the free end of the lamp cord may conveniently be provided with an attachment plug. The unit assembly may be secured to a wall as described or it may be rested on the floor or used in any other desired way. The opening 79 is long enough to accommodate a section of the housing 24 of sufficient length to provide the desired number of outlet openings and I have found a device of a length sufficient to provide six sets of openings 64 spaced to permit the simultaneous connection of standard attachment plugs therein to be sufficient for average usage.

I have explained how a connector block 82 may be mounted in the opening 81 to thereby connect lamp cord or the like to the conductor strips in the unit assembly. However, under certain conditions it may be desirable to provide other attaching means as, for example, that illustrated in Figs. 17 and 19. As there illustrated, a connector block 99 is mounted in the opening 81 and has attachment prongs 100 extending from the free end thereof to which a suitable female attachment plug may be connected. The prongs 100 include connector strips 101 which extend through the connector block 99 and bosses 102 thereon and into the conductor strips C and, if desired, the connector strips 101 may be soldered in the conductor strips C to insure good electrical connection. The bosses 102 are similar to the bosses 83 and are used in the same manner. The connector block 99 is sectional in construction and is fastened in position and the sections thereof are interconnected by a grommet 103 in the same manner as that in which the grommet 90 secures the connector block 82 in position and interconnects the parts thereof.

Instead of using the end closing member 93 the ends of the conductor strips C and the insulating strips 53 may be held against lengthwise movement by slotting the web 28 and the inner adjacent walls of the channels 25 and 26, as indicated at 104 in Fig. 17, and fitting a flat plate 105' of insulating material in this slot, as illustrated in Figs. 17 and 18. The plate 105' will rest on the bights of the channels 25 and 26 and will be prevented from outward movement by the face plate 31. This provides an inexpensive arrangement for holding the conductor and insulating strips against lengthwise movement but the use of the end closing member 93 is preferred.

In some instances it may not be practical to attach conductors at an end of the housing 77 or it may be desirable for other reason to make connection at the front of the housing 77. An arrangement for accomplishing this is illustrated in Fig. 20 and as there shown a plate, generally indicated by 105, includes a base portion 106 adapted to be fitted between the limbs 55 and 56 of a conductor strip C, and the plate 105 includes a prong 107 which extends through an opening 64 in the face plate 31. The plate 106 may be soldered in position and by providing two such plates so that the prongs 107 thereof project through a cooperating set of openings 64 and a female attachment plug may be fitted thereon to thereby connect the conductor strips C in electric circuit.

Conductor enclosing baseboards have been provided heretofore which have included independent passages so that low tension conductors such as telephone wires could be arranged in one passage and relatively high tension wires such as a lighting circuit could be arranged in another passage. A baseboard of this type is illustrated in Fig. 21 and by referring thereto it may be seen that the baseboard includes a passage 108 in which low tension telephone wires 109 or the like are mounted. However, in place of providing another passage through which wires or the like may be extended the lower part of the front wall 110 of the baseboard is bent to provide a channel 111 opening through the front wall 110. This channel is sized to receive my outlet device which is generally indicated by D. It should be noted that the U-shaped portions 36 and 37 are omitted from the outlet device D, as illustrated in Fig. 21, and that the inclined flanges 38 and 39 are provided at the ends of the sections 34 and 35 in the manner previously explained. The U-shaped portions 36 and 37 may be omitted form the device when used for this purpose for the reason that the edges of the channel 111 may be formed accurately and the channel may be sized properly to accommodate the outlet device D. However, the U-shaped portions 36 and 37 may be used with this arrangement, if desired. Furthermore, the outer edges of the channel 111 may be crimped to provide parts like the lips 43 and 44 and 81 to fit in the grooves 40 and 41 should it be found advantageous so to do. My outlet device, when so used, supplants the passage ordinarily provided for high tension wires and affords a plurality of places whereat electrically operated devices may be connected in circuit, in contradistinction to the limited number of such places afforded in baseboards of this kind as constructed heretofore.

One of the numerous advantages of my invention is that the housing sections 24 may be installed at the time a wiring system is being roughed in and the fact that the insulating and conductor strips and similar parts may be installed at a later time avoids damage to these subsequently installed parts. Furthermore, adjoining sections of the housing, terminal boxes, and corner members may all be interconnected in such a manner that buckling at the joints is effectively prevented which is attained by interlocking lips on the connectors in the grooves provided on the outlet device. Furthermore, the joints between the aligned housing sections and the joints between aligned insulating and conductor strips may be staggered relative to each other and by providing the connecting block of insulating material between adjoining ends of insulating and conductor strips grounding of the conductor strips on the metallic housing is prevented. The terminal block affords firm interconnection of conductors with the conductor strips in the outlet device and the overlapping of the insulating strips with parts on the terminal block effectively prevents grounding at the interconnections.

The inturned parts at the upper ends of the insulating strips effectively prevent grounding of the conductor strips under normal and abnormal conditions. For example, if an abnormal load is placed upon the outlet device causing it to heat, the insulating strips tend to expand but the overlapping portions are merely forced by such expansion into tighter engagement with the underside of the face plate and hence even under an abnormal condition grounding and short-circuiting is effectively prevented.

The face plate may be applied or removed easily and it may be extended across terminal boxes and corner members so that the device has a continuous appearance from the front notwithstanding its sectional character.

By providing the rearwardly bent portions on the upper part of the housing and engaging these portions with the face of the member in which the groove is formed to receive the outlet device accurate orientation of the outlet device in the groove is assured. Furthermore, this arrangement eliminates the necessity of there being a direct relationship between the depth of the baseboard and the depth of the outlet device, and this permits the outlet device to be used with baseboards of varying thickness including the thinnest of baseboards. Furthermore, the parts extended beyond the outer walls of the channels of the outlet device overlap the edges of the groove in which the outlet device is mounted and therefore an unsightly appearance along the edges of the outlet device is avoided.

The unit assembly can be used in a kitchen or a dining room to permit a number of electrical appliances to be connected thereto and the unit assembly may also be used at a work bench. It may be secured to a wall or the like or mounted directly on the table. Moreover, if desired, the unit assembly may be laid upon the floor to afford a plurality of places whereat electrically operated devices may be connected and this is particularly advantageous for display purposes particularly where lamps are being displayed.

The foregoing are a few of the numerous advantages of my invention and there are many others which will be readily apparent to those skilled in the art. Furthermore, I have illustrated and described selected embodiments of my invention but it is to be understood that variations and modifications may be made therein and I therefore do not wish to be limited to the precise details set forth but desire to avail myself of such changes and alterations as fall within the purview of the following claims.

I claim:

1. In an elongated electrical conductor housing having a conductor therein adapted to be engaged by a prong of a standard electrical fitting, means for accommodating said housing to a groove in a wall or the like of a depth shallower than the full depth of said housing, said means comprising outwardly extending flanges along the side edges of said housing and including rearwardly extending beads of sufficient size to contact the face of the wall or the like when the housing approaches the bottom of the groove to position said housing in said groove.

2. An electrical conductor housing adapted to be mounted in a groove in a wall or the like and having a channel therein, a cover plate for closing said channel, outwardly extending flanges on said housing adapted to extend beyond and conceal the edges of said groove, said flanges being reversely bent to form beads for contact with the wall in which the groove is provided to thereby position the housing in the groove, the outwardly disposed walls of said beads providing flanges engageable with the side edges of said cover plate to retain said cover plate in position.

3. An electrical outlet device including a plurality of sections each comprising a housing, the housings of each of the sections being arranged in alignment with each other and having adjacent ends abutted, said housings having grooves in the side walls thereof, a channel plate overlapping the abutted ends of said housings for an appreciable distance on each side of the abutment, and means on said channel plate adapted to be sprung into said grooves to secure said channel plate in position to interconnect the sections.

4. A continuous electrical outlet device including a plurality of sections each comprising a housing, the housings of said sections being arranged in alignment with each other and having adjacent ends abutted, said housings having groves in the side walls thereof near the upper edges thereof, a channel plate mounted over the bottoms of said housings and overlapping the abutted ends of said housings for an appreciable distance on each side of the abutment, and inturned flanges at the upper free edges of said channel plate adapted to be sprung into said grooves to secure said channel plate in position to interconnect the sections.

5. In a unit assembly providing a plurality of places whereat electrically operated devices may be connected in an electrical circuit, an elongated member having an opening in one wall thereof, an elongated metallic housing mounted in said opening and extending into said member, said housing having a channel therein extending longitudinally thereof, contact means in said channel, means completely insulating said contact means from said housing, a cover plate on said housing and closing said channel, said cover plate having openings therein through which electrical connection may be made with said contact means, means on said housing and engaging the side edges of said cover plate to secure said cover plate thereto, and means on said elongated member at opposite ends of the opening therein and engaging the ends of said cover plate to prevent longitudinal movement of the cover plate in the means engaging the side edges thereof.

6. In a unit assembly providing a plurality of places whereat electrically operated devices may be connected in an electrical circuit, an elongated member having an opening in one wall thereof, an elongated metallic housing mounted in said opening and extending into said member, said housing having a channel therein extending longitudinally thereof, contact means in said channel, means completely insulating said contact means from said housing, a cover plate on said housing and closing said channel, said member and said housing having openings in corresponding ends thereof, a connector passed through the opening in the end of said member and having means thereon passed through the opening in the end of said housing and engaged with said contact means, and means securing said connector to said housing, said cover plate having openings therein through which electrical connection may be made with said contact means.

7. In an electrical outlet device including a plurality of metallic housings, each of said housings having a channel therein, a conductor strip mounted in said channel, an insulating strip in said channel partially surrounding and insulating the conductor strip from the metallic housing, the housings being aligned with each other to provide an extended device, the combination of a member positioned in at least one of said housings between the insulating and conductor strips in adjacent housings, parts on said member over which the adjacent end portions of the insulating strips in adjacent housings are extended, and means passed through said member and electrically interconnecting the conductor strips mounted in insulating strips in the adjacent housings.

8. A device for preventing grounding of conductor strips in aligned and abutted sections of an outlet device wherein the sections include metallic housings having channels therein, conductor strips in said channels, insulating strips in said channels partially surrounding and insulating the conductor strips from the metallic housings, said device including a member having end parts of smaller cross section than the intermediate part thereof whereby the adjacent end portions of the insulating strips in abutted sections of the outlet device may be extended over said end parts when the ends of the conductor strips in the insulating strips are abutted with the ends of said end parts, said member having a slot therein, and a connector strip mounted in said slot to engage the conductor strips abutting said end parts and electrically interconnect said conductor strips.

9. An end closing member for an electrical outlet device and comprising a plate, a lug projecting from said plate at the top edge thereof, and a pair of bosses projecting from said plate parallel with said lug and positioned below said lug.

10. An end closing member for an electrical outlet device and comprising a plate, a lug projecting from said plate at the top edge thereof, a pair of bosses projecting from said plate parallel with said lug and positioned below said lug, and another lug on said plate in substantial alignment with but projecting opposite to the first-named lug.

11. A box adapted for use with an electrical outlet device including an open faced housing having grooves in the side walls thereof and retaining means on the free edges thereof for securing a closure plate over the open face of said housing, said box including a body having an open face, a part on said body at an end thereof adapted to be clamped on the adjacent end of the housing, said part having flanges thereon adapted to be sprung into said grooves to interconnect the box and the housing, and means on the free edges of said body inwardly of said part adapted to be aligned with and to cooperate with the retaining means on said housing and secure the closure plate over the open side of said body whereby the closure plate may be uninterruptingly extended over the housing and box.

CHARLES G. BEERSMAN.